United States Patent
O'Donnell (10) Patent No.: US 6,374,369 B1
(45) Date of Patent: Apr. 16, 2002

(54) STOCHASTIC PERFORMANCE ANALYSIS METHOD AND APPARATUS THEREFOR

(75) Inventor: Ciaran O'Donnell, Santa Clara, CA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/316,784

(22) Filed: May 21, 1999

(51) Int. Cl.$^7$ ................................................ G06F 11/26
(52) U.S. Cl. .................... 714/38; 717/4; 717/9
(58) Field of Search ............................ 714/38, 34, 35; 717/4, 8, 9, 10; 710/266

(56) References Cited

U.S. PATENT DOCUMENTS

| | | | |
|---|---|---|---|
| 4,845,615 A | | 7/1989 | Blasciak .................... 364/200 |
| 5,355,487 A | * | 10/1994 | Keller et al. ............... 395/650 |
| 5,774,724 A | | 6/1998 | Heisch ........................ 395/704 |
| 5,911,041 A | * | 6/1999 | Schaffer ...................... 714/38 |
| 5,937,191 A | * | 8/1999 | Graham ........................ 717/4 |
| 5,960,198 A | * | 9/1999 | Roediger et al. ............... 717/4 |
| 6,002,872 A | * | 12/1999 | Alexander, III et al. ........ 717/4 |
| 6,016,557 A | * | 1/2000 | Kasprzyk et al. ............. 714/38 |
| 6,079,032 A | * | 6/2000 | Peri ............................ 714/38 |
| 6,148,396 A | * | 11/2000 | Chrysos et al. ............. 712/227 |
| 6,154,857 A | * | 11/2000 | Mann ........................... 714/30 |
| 6,311,327 B1 | * | 10/2001 | O'Brien et al. ................ 717/4 |

FOREIGN PATENT DOCUMENTS

| | | | |
|---|---|---|---|
| EP | 0434158 A3 | 6/1991 | ........... G06F/11/34 |
| EP | 0434158 A2 | 6/1991 | ........... G06F/11/34 |
| EP | 0646868 A1 | 4/1995 | ........... G06F/11/32 |
| WO | WO9816882 | 4/1998 | ........... G06F/11/30 |

OTHER PUBLICATIONS

Plattner B Et Al: "Monitor Program Execution: A Survey" Computer, US, IEEE Computer Society, Long Beach, CA, US, vol. 14, No. 11, Jan. 20, 1982, pp. 76–93.

* cited by examiner

*Primary Examiner*—Scott T. Baderman (57) ABSTRACT

A programmable method for analyzing the performance of software using a combination of statistical sampling, hardware events and feedback, and a finite state machine execution model. Performance analysis code is integrated with the object code of the software it is analyzing and profiling. Using hardware timers and triggers, the analysis code records timing information at each timer or trigger event, where some events may be the result of stochastic sampling. At certain times during the execution and termination of the software being profiled, results of the profiling are output. Upon the termination of the software being profiled, post processing is optionally performed on the profiling output timing information, and the result of this post processing provides a human readable indication of where the analyzed software spent its execution time. A system for implementing the profiling method in hardware is also described.

46 Claims, 8 Drawing Sheets

```
phase0:OUTPUT "["
       STRING "OBSERVER V1.0"
       CONST 16384
       FUNC malloc
       POP (0)
       SWITCH(phase1)
```

FIG. 3

```
phase1:GET_TIMER
       POP(1)
       TIMER_COUNT(1, -1000)
       TIMER_MODE(1, EVENT(-1) + PROGRAM_RUN)
```

FIG. 4

```
phase2:GET_data_BREAKPOINT
POP(2)
BREAKPOINT_LOW(2, &array[0]
BREAKPOINT_HIGH(2, &array[ARRAY_MAX])
BREAKPOINT_MODE(2, 1<<CACHE_READ_MISS);
GET_TIMER
POP(3)
TIMER_COUNT(3, 1)
TIMER_MODE(3, BUSY + VALUE(2) + PROGRAM_LEVEL + START)
```

FIG. 5

```
SET_VECTOR(1, phase2)
SUSPEND
```

FIG. 6

```
SWITCH(phase2).
```

FIG. 7

```
SET_VECTOR(3, phase3)
SUSPEND
```

```
phase3:GET_TIMER
    POP(4)
    TIMER_MODE(4, EVENT(-1) + PROGRAM_RUN)
    GET_inst_BREAKPOINT
    POP(5)
    BREAKPOINT_LOW (5, &__start_program)
    BREAKPOINT_HIGH(5, &__end_program)
    BREAKPOINT_MODE(5, 1<<INST_FETCH)
    GET_TIMER
    POP(6)
    TIMER_MODE(6, BUSY + VALUE(6) + PROGRAM_LEVEL + START)
    GET_data_BREAKPOINT
    POP(7)
    BREAKPOINT_LOW (7, &__data_start)
    BREAKPOINT_HIGH(7, &__data_end)
    BREAKPOINT_MODE(7, 1<<DATA_CACHE_MISS_CYCLE |
    1<<BANK_CONFLICT)
    GET_TIMER
    POP(8)
    TIMER_MODE(8, BUSY + VALUE(7) + PROGRAM_LEVEL + START)
    CONST(20)
    POP(9)
    SET_PCSW(TRACE_BIT)
    SUSPEND
```

```
include <tmlib/profile_api.h> profileBegin()
{
        struct profileCaps caps;
        int handle;

memset(&caps, 0, sizeof(caps));
        caps.freq = 10000;
        caps.nsamples = 20;
        strcpy(caps.version, TMPROF_VERSION);
        strcpy(caps.args, "<command line>");
        handle = open("mon.out", O_RDWR|O_CREAT|O_TRUNC|O_BINARY, 0666);
        profileInit(&caps, write_callback, handle);
}
```

FIG. 10A

```
static int
write_callback(int handle, void *addr, int nb)
{
  if (nb == 0)
    return close(handle);
  else
    return write(handle, addr, nb);
}
```

FIG. 10B

```
main()
{
  profileBegin();
  profileStart();
  fib(20);
  profileStop();
  profileFlush();
} fib(n) {
  if (n < 3)
       return 1;
  else
       return fib(n-1) + fib(n-2);
}
```

FIG. 10C

FIG. 10D        void profileClear (float factor)

FIG. 10E        int profileArgs(struct profileCaps *pcaps, char **argv, int argc);

```
void root(void)
{
  printf("Hello, world\n");
  t_create( "aaaa", 4, 10000, 10000, 0, &task1 );
  t_create( "catc", 100, 10000, 10000, 0, &task2);
  profileBegin();
        (...)
} void SwitchHandler(int to, void *totcb, int from, int *fromtcb)
{
  int clocknow = CYCLES();

if (from==task1)
    TOTAL += clocknow - NOW;
  if (to==task1)
    NOW = clocknow;
  if (to==task1)
    profileStart();
  else
    profileStop();
}
```

FIG. 11

STOCHASTIC PERFORMANCE ANALYSIS METHOD AND APPARATUS THEREFOR

BACKGROUND OF THE INVENTION

The present invention relates generally to the performance analysis of software, also known as "profiling". More specifically, the present invention relates to performance analysis of software by controlling statistical sampling of performance measures using a finite state machine operated in response to one of a hardware interrupt and a timing interrupt. A corresponding apparatus and software program set are also disclosed.

Software developers, especially those developing time and/or performance critical software, such as real-time programs for embedded processors or driver software for peripherals, need to determine where and how much time is spent in the various parts (routines) of their software in order to determine how to further optimize their software to meet necessary performance and response requirements. Such performance analysis, also known by the term "profiling," has traditionally been one that is intrusive to the code being analyzed.

The state of the art in profiling software for performance requires modification of the software being profiled, either at the source code level (e.g. via a tool like gprof or custom program functions or macros) or at the object code level (e.g. via a tool like Pixie), and/or possibly a dedicated compiler that offers special support for profiling. Such methods are impractical for real-time performance critical code, as the changes to the software being analyzed are by necessity invasive enough to significantly alter the actual execution of the software being analyzed. Similarly, profiling which depends on alternate compilers completely changes the code produced for analysis and profiling, significantly increases the overhead of execution, and may even introduce new bugs as a result of the new profiling code.

One very serious side effect of this form of profiling is that data and instruction caches and, more importantly, the loading of such caches, is repeatedly disrupted by the profiling process, because the profiling code is physically interleaved with the execution of the software being analyzed. In real-time and performance critical software, proper cache utilization is a vital component.

Commonly, a profiling program will intercept each function call being made, log certain information about it, record a starting time, call the next function in line, and then upon a return from that function, will log the ending time in order to calculate elapsed time. As such, profiling programs are generally written in compiled languages; there's no control over execution overhead involved in performing the actual profiling and, therefore, results produced are very coarse. Additionally, the profiling software needs to have an extensive internal understanding of how each function operates.

As a result of these limitations in standard profiling, stochastic methods of profiling have been developed. Such methods use a hardware timer to initiate an interrupt, which in turn initiates execution of the profiling tool. However, the data that can be measured using such existing techniques (e.g. UNIX's prof) are quite limited in practice. Trap driven methods (e.g. Philips' tmprod) use a trace interrupt, which is typically used to trace through individual instructions or blocks of code, i.e., routines. This, in turn, introduces a significant overhead, typically more than 150 percent. While methods have been developed, such as that disclosed in U.S. Patent No. 4,845,615—"Software Performance Analyzer," which patent is incorporated herein by reference and which patent aims to minimize this overhead to limiting trace interrupts or exceptions to branches, these methods provide only limited control over overhead.

Furthermore, hardware based profiling methods require the introduction of impractical and costly additional functionality into the hardware that the software being analyzed runs on, often necessitating changes to the bus and board design and costly external hardware.

Practical performance analysis and profiling of performance critical (e.g. real-time) software applications is therefore not achieved with software based methods using the present state of the art, as existing methods modify the behavior (e.g. cache) of the software being analyzed. Also, existing profiling methods are either software or hardware based, but not both.

As such, what is needed is a method for profiling software in which tools don't need to be modified, and in which it is possible to analyze performance without access to source code and with minimal behavioral modification. What is also needed is a corresponding computer system and operating programs therefor which permit software profiling of user selectable routines with user selectable weighting. It would be desirable if the profiling method and corresponding computer system would provide separate performance information on the application software being profiled and the software performing the profiling so that a true measure of performance advantageously can be generated.

SUMMARY OF THE INVENTION

Based on the above and foregoing, it can be appreciated that there presently exists a need in the art for a method which overcomes the above-described deficiencies of the presently available technology. The present invention was motivated by a desire to overcome the drawbacks and shortcomings of the presently available technology, and thereby fulfill this need in the art.

The present invention is directed to methods and corresponding systems for profiling of performance critical software, wherein it is necessary to measure the execution of software code with a high level of detail without significantly modifing or altering the behavior of the code being profiled, so that the measurements can be used to determine where additional tuning of the code can be performed in order to meet appropriate performance requirements.

An additional object of the present invention is to minimize overhead caused by the profiling process (also referred to as the "observer") such that the performance behavior of the code being analyzed is not significantly altered.

Yet another object of the present invention is that the overhead of the profiling process can be estimated so as to provide significant accuracy to the profiling being performed by removing the overhead attributable to the profiling process.

Another object of the present invention is to ensure that overhead attributable to the observer is controllable via a feedback mechanism.

Yet another object of the present invention is to provide a profiling method and corresponding system which permits programming of the observer, to thereby permit measurement of selected routines.

Still another object according to the present invention is to provide a profiling method and corresponding system which provides the ability to accurately measure performance or execution time of studied code, down to the clock-cycle level.

Another object according to the present invention is to provide a profiling method and corresponding system which produces timing information in the form of a log which contains timing information measured by the profiling process.

Yet another object according to the present invention is to provide a profiling method and corresponding system which does not required any change in the source code of the code being analyzed in order to support profiling, and in fact, access to source code is not even necessary for the profiling process.

Still another object according to the present invention is to permit the use of the same compiler and compilation tools as are used for the creation of a production version of the software being analyzed, instead of requiring a modified or different compiler with profiling features built into it.

An additional object according to the present invention is to provide a profiling method and corresponding system which eliminates the need for expensive external profiling hardware.

Another object of the invention is to provide a profiling method and corresponding system which is low in cost and applicable to a wide range of hardware and operating systems.

Yet another object of the invention is to provide a profiling method which allows for both systems and task based profiling.

A further object according to the present the invention is to provide for a profiling method which is machine independent, portable across processors, and which can be licensed to processor manufacturers and developers, reducing support costs, and program development costs.

A still further object according to the present invention is to provide a profiling method and corresponding system which can be employed by processor manufacturers and developers to reduce support and program development costs.

These and other objects, features and advantages, according to the present invention, are provided by stochastic sampling, the use of normally available hardware events and triggers, and a finite state execution model incorporated into the profiling process.

These and other objects, features and advantages according to the present invention are provided by a method for analyzing the performance of application software during execution thereof by a computer system implementing profiling software generating a finite state automaton. Preferably, the method includes steps for:

(a) executing the profiling software to thereby generate the finite state automaton incorporating at least one user-selected performance parameter;
(b) executing the application software and the finite state automaton in an interleaved fashion;
(c) observing the execution of at least one selected routine of the application software using the finite state automaton; and
(d) generating performance data indicative of performance of the selected routine of the application software.

These and other objects, features and advantages according to the present invention are provided by a method for analyzing the performance of application software during execution thereof by a computer system implementing profiling software generating a finite state automaton. Advantageously, the method includes the steps of:

(a) selecting at least one user-selected performance parameter for the application to the profiling software;
(b) executing the profiling software to thereby generate the finite state automaton facilitating stochastic sampling of at least one selected performance parameter of the at least one selected routine of the application software;
(c) linking the finite state automaton to the application software to resolve references in object code of the finite state automaton with references in object code of the application software to thereby create a linked executable program that integrates the application software with the finite state automaton;
(d) executing the application software routines and the finite state automaton functions of the linked executable program in an interleaved fashion to thereby establish hardware conditions under which the at least one hardware interrupt will be generated.;
(e) observing the execution of at least one selected routine of the application software routines of the linked executable program using the finite state automaton; and
(f) generating performance data indicative of the performance of the selected routine of the application software.

These and other objects, features and advantages according to the present invention are provided by a computer system for analyzing the performance of application software during execution thereof by employing profiling software generating a finite state automaton, including a first device for executing the profiling software to thereby generate the finite state automaton incorporating at least one user-selected performance parameter;
a second device for executing the application software and the finite state automaton in an interleaved fashion;
a third device for observing the execution of at least one selected routine of the application software using the finite state automaton; and
a fourth device for generating performance data indicative of performance of the selected routine of the application software.

These and other objects, features and advantages according to the present invention are provided by machine readable code stored in a memory for converting a general purpose computer system into a dedicated computer system for analyzing the performance of application software during execution of a plurality of software devices. The machine readable code advantageously can include:

a first software device which adjusts the performance data associated with the profiling software to thereby take into account overhead associated with the execution of the finite state automaton;
a second software device which generates the finite state automaton incorporating at least user-selected performance parameter;
a third software device which links the finite state automaton to the application software to thereby resolve references in object code of the finite state automaton with references in object code of the application software to thereby create a linked executable program that integrates the application software with the finite state automaton;
a fourth software device which execute the application software routines and the finite state automaton functions of the linked executable program in an interleaved fashion to thereby observe the execution of at least one selected routine of the application software routines using a corresponding finite state automaton function and to thereby generate performance data indicative of performance of the selected routine of the application software routines; and a fifth software device which processes the performance data to thereby provide a human readable indication of the observed performance of the at least one selected routine of the application software.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

The invention uses a combination of statistical sampling, hardware events and feedback, and a finite state machine execution model to record profiling information. In cases where the profiling information is stored in machine readable format, a post-process analysis of this information can be performed to produce human readable output. The inventive profiling method and corresponding computer system for profiling software without requiring a special compiler or modification to the source code of the software being analyzed according to the present invention will be described in greater detail below.

In one embodiment of the present invention, the stochastic performance analysis method takes the form of profiling process or observer code, i.e., a finite state machine automaton or, simply, a state machine, which is linked into the software being analyzed for the purpose of determining the starting point of various key software subroutines via access to the software's internal symbol table. Once the software is executed, the observer is called to initialize both itself and the underlying support hardware, including both timers and breakpoints, as well as allocating dedicated memory for storing the results of measurement information logging. After initialization, control is passed back to the software being profiled. This profiled software continues operating until such time as one of the observer-set timers or breakpoints is triggered, which causes control to be passed to a dedicated routine in the observer. That routine, in turn, may either log information or set or reset existing triggers and breakpoints which, in turn, will be triggered by some other event occurring later on during the software's execution. This will continue until the observer has completed the software profiling operation and the software's execution is terminated. At this time, the profiling method or observer will be called to dump the measurements information it has collected into the log file. Advantageously, the profiling method and corresponding system can process the log file to thereby format the logged information into human friendly form, i.e., a form which is both readable and interpretable by the person wishing to review the results of the performance profiling operation.

It will be appreciated that the observer of the profiling method advantageously can be programmed to focus on particular parts, i.e., functions or routines or program variables, of the software in addition to the software as a whole. The sequence in which timers, exceptions, and breakpoints are set and checked, as well as the data used to set and check these trigger events, determines what routine (s) in the software is (are) to be analyzed. This sequence, by virtue of its operation, constitutes a finite state machine automaton in which, each time an event triggers a call to the observer, the processing performed by the observer determines what will be analyzed next, i.e., in the selected sequence. Multiple parallel analyses may be in process at any one time as well.

In another embodiment of the present invention, the measurement information stored in the log file and recorded by the observer may also be used to generate information which advantageously can be used to generate the execution tree, or a subset of the execution tree, of the software being analyzed or observed. Similarly, the observer can be used to generate a history buffer which shows the sequence of functions executed in the software.

Before discussing the preferred embodiments according to the present invention in great detail, it would be helpful to establish the terminology used in describing the present invention and its various objects and features. The user first selects routines and/or variables that are of interest in profiling the software under test, selects data breakpoints and instruction breakpoints, if known from the symbol table, and establishes timer and memory allocations. The user then executes or compiles the profiling software to thereby generate the observer, which is also known as a finite state machine automaton or, more simply, state machine. The user then links the observer or state machine to the software under test to resolve and link the address locations of the software under test to corresponding references in the state machine. The linked software is then executed, which causes initialization of first the software under test and then the state machine. One of ordinary skill in the art would recognize that the opposite execution sequence could also be employed. Once the profiling of the software under test has been completed, the linked software is shut down and data indicative of the performance of the software under test is analyzed, either directly or with the assistance of a data interpretation program, i.e., tool.

A particular preferred embodiment according to the present invention will now be described while referring to FIGS. 1A and FIG. 1B. More specifically, a profiling method and corresponding system according to the present invention advantageously can be used to observe certain aspects of the execution and performance of a piece of software, such as:
- the number of instruction cycles executed;
- the number of instruction cache cycles;
- the number of data cache cycles;
- the distribution of maximum interrupt response times;
- calls to a routine;
- stack utilization;
- heap utilization; and
- an actual program variable, such as $\alpha[i]$.

Figure 1A:
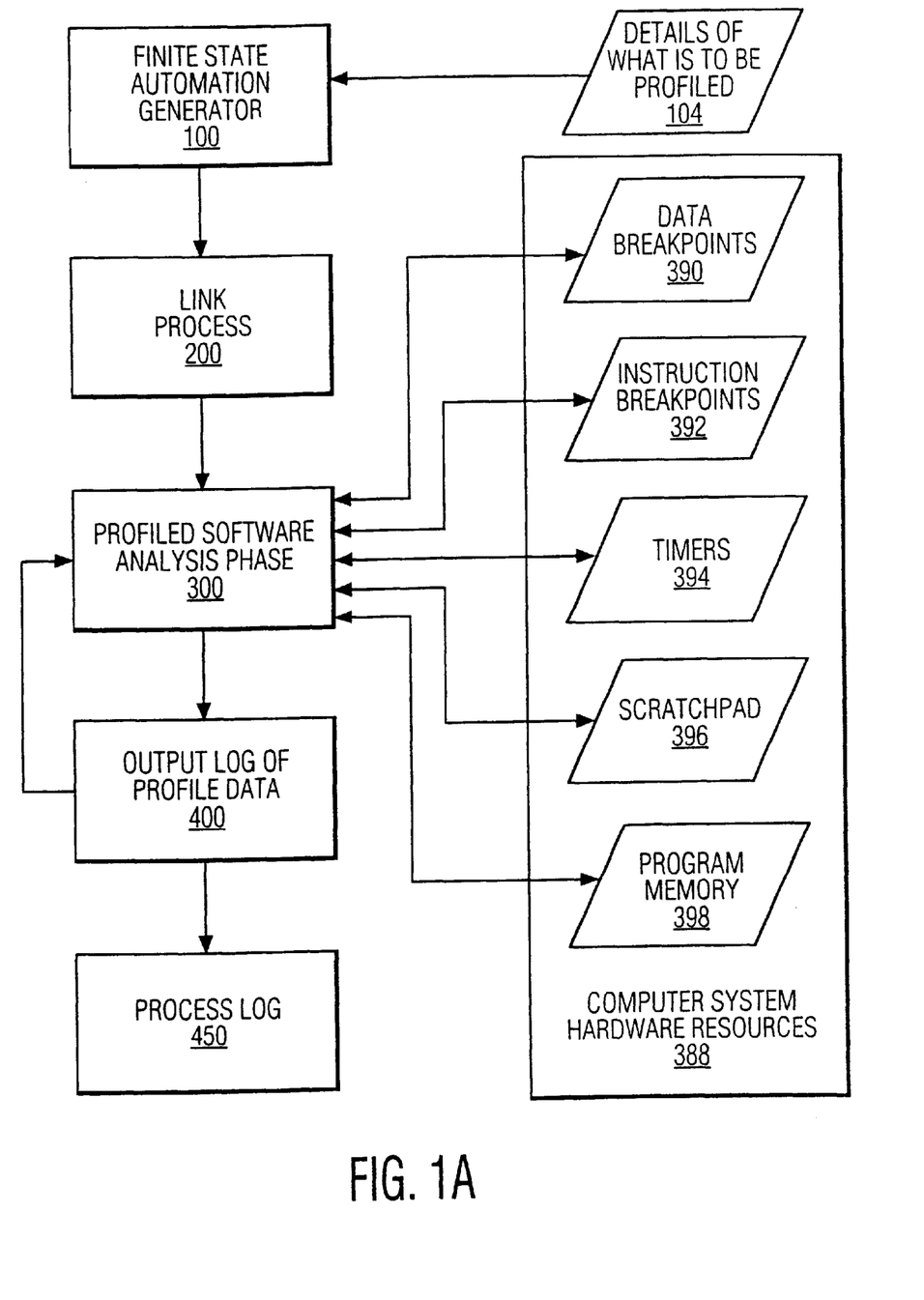
FIG. 1A is a high level functional block diagram which is useful in understanding how the invention operates in conjunction with a specification of what is to be profiled and various hardware resources.

In the block diagram overview in FIG. 1A, the user prepares a specification in block 104 of what is to be observed by the profiling process or observer and enters the particulars of the specification into the profiling software or tool. Upon execution of the profiling software in block 100, the profiling software generates the observer, i.e., a finite state automaton. It should be noted that block 100 is not restricted to implementation just on the hardware being used during the execution of the profiling process, but in fact can be run with any hardware and operating system configuration, as might be necessary in a cross-platform development environment. Next, the finite state automaton is linked in block 200 to the software under test, i.e., profiled software, using a standard linking program. The combined, integrated profiled software, which includes the finite state automaton is then executed and runs its course in block 300, during which time the finite state automaton performs its profiling functions utilizing the computer system hardware resources pictured at right in dotted block 388 in the same FIG. 1A. The finite state automaton uses a combination consisting of none, one, or more data breakpoints 390, instruction breakpoints 392, and timers 394 to perform its profiling functions. Also used during this process are scratchpad memory 396 for storing the on-going results of the profiling process, as well as program memory 398 in which to run the finite state automaton as well as the software being profiled, and also contains the data of the software being profiled. Once the integrated profiled software completes its function and/or is terminated, or when the logging buffer fills up or a appropriate call is made to the profiling Application Programming Interface (API) resulting in the need to flush the logging buffer, the finite state automaton outputs its log of profiling information to a file in block 400. In the case of a logging buffer flush, control returns back to block 300, as indicated by the dotted line from block 400. The log is then optionally processed to increase human readability in block 450. It should be noted that block 450 can be performed on any hardware/operating system platform, and is not restricted to only the hardware configuration in use during the actual execution of the profiling process.

Figure 1B:
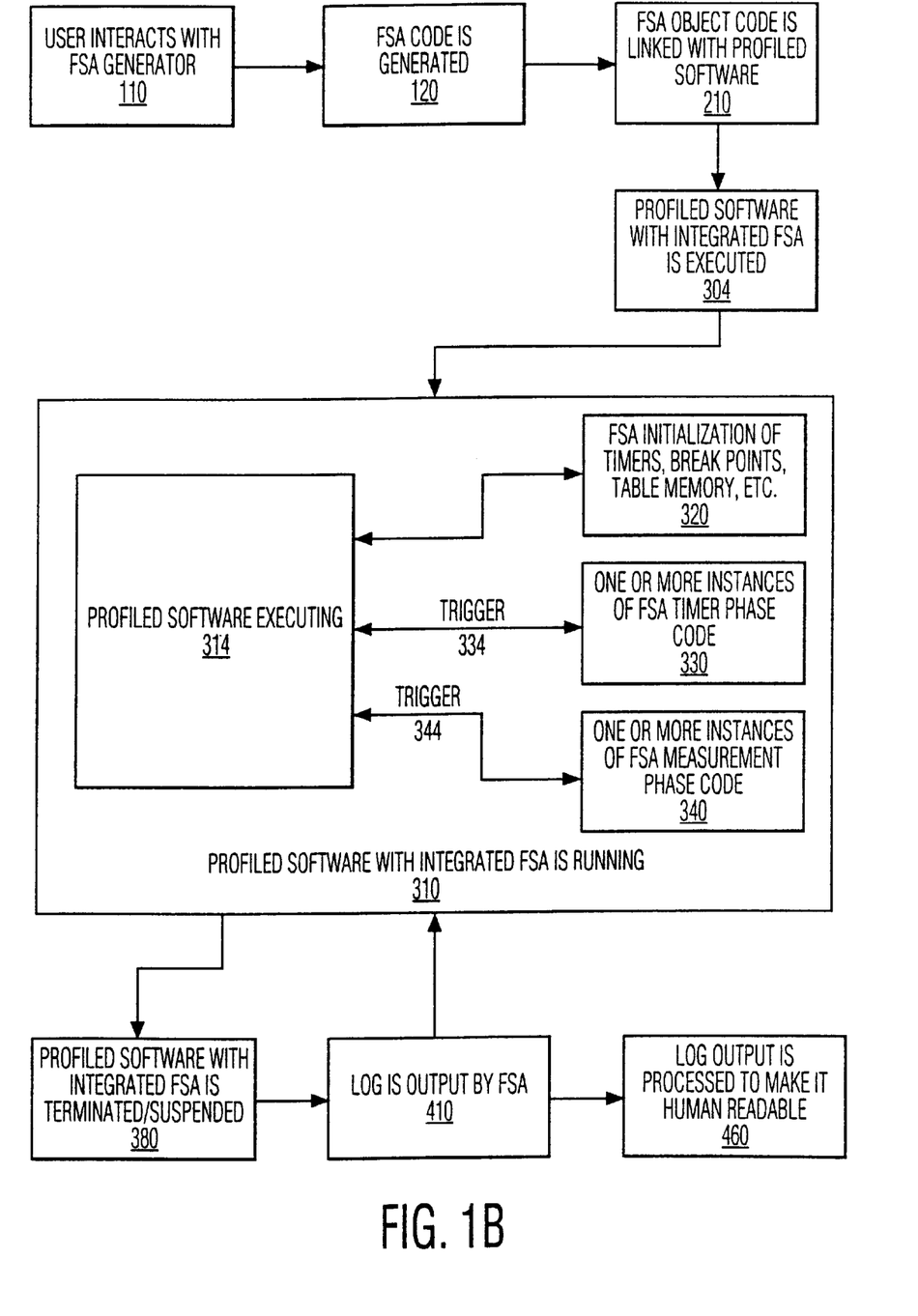
FIG. 1B is a high level functional flow chart depicting the steps used in the invention to create a finite state automaton, and then operate it in an interleaved fashion with the software being profiled in order to produce a log containing the results of the profiling operation performed by the finite state automaton.

Further detail is provided in the function flow chart of the invention in FIG. 1B. In step 110 the user interacts with the finite state automaton (referred to as "FSA" in FIG 1B) generator tool, which in step 120 generates the finite state automaton object code. The interaction in step 110 may involve selecting one or more routines in the software being profiled and/or weighting for different types of performance measurements, as detailed later. In step 210 the finite state automaton object code is linked, via a standard link tool, to the software being profiled (referred to as "profiled software" in FIG. 1B) to resolve any references in the finite state automaton to the profiled software, and to create an executable program. In step 304, the executable program produced by the link tool in step 210 is executed.

The shaded box 310 represents the running program produced in step 210 and executed in step 304. The large box 314 at left in the running program represents the profiled software performing its designated function, while the three smaller boxes at right represent a very basic overview of the finite state automaton. The arrows connecting the two sets of boxes are intended to demonstrate the interleaved nature of the execution of the profiled software with the finite state automaton.

When the integrated program 310 starts running, the finite state automaton initialization sequence in step 320 is initiated. This step 320 involves setting up a table memory in which to store results of the on-going profiling process, initializing timers and/or breakpoints, as well as performing any other initialization required for the specific profiling being performed by the particular generated finite state automaton, which may include the configuration of additional memory areas and the setting of other hardware interrupts. More details on this initialization step are provided later. Once step 320 is complete, control is returned to the profiled software.

Once the initial trigger conditions, e.g. an amount of elapsed clock cycles, set during finite state automaton initialization step 320 are met, an interrupt is issued by the hardware and a call is triggered via a trigger 334 to a step 330. A step 330 processes the event that caused a trigger 334 and then sets the system hardware (e.g. timers) to trigger an interrupt when another event occurs.

That event may in turn again use a trigger 334 to call a step 330. It needs to be noted that in practical use there will be multiple triggers 334 and steps 330, each potentially unique in what it is triggered by and what function it performs. It goes without saying that each step 330 is one node or state in the finite state automaton.

Interleaved with various calls to various steps 330 will be triggers 344 and steps 340 which perform measurement functions instead of timing or counting functions. Such measurement steps 340 are detailed below.

Once the program 310 has run its course and/or is terminated, or when the logging buffer becomes full (or another type of logging condition is encountered, such as a call to the profiling API to flush the logging buffer) requiring the execution of program 310 to be suspended temporarily, in step 380, the finite state automaton produces a log, which is typically output to a file in step 410. In the event of a the log output in step 410 being the result of the automatic or requested flushing of the logging buffer, control is returned back to program 310, which resumes execution, as indicated by the dotted line from step 410. In step 460, the log file is analyzed to produce more human readable output, perhaps in the form of a report, or via graphical means such as pie charts, bar charts, or other types of graphics, as this is a common technique for analysis. Such an output viewer/ analyzer can be easily built via a Graphical User Interface (GUI) toolkit, such as the UNIX-based TCL/TK software. Additional details can be found in "Practical Programming in TCL and TK", $2^{nd}$ Edition, by Brent B. Welch (Prentice Hall, 1997).

It should be mentioned that a particular preferred implementation for an embedded environment could execute the three phases (automaton generation, profiling, and log file generation and analysis) offline (separately), while another preferred implementation for development could execute the three phases online (together). As indicated above, the automaton generation and log analysis phases could also be executed on different systems or the same system.

It should also be mentioned that in one preferred embodiment of the present invention for operating in an embedded environment, a preferred implementation could link the observer with the program either statically or by dynamic linking. In a consumer electronics environment, the observer generated by the profiling software could be loaded via an EEPROM or by JTAG for programmability.

An ideal implementation of the observer requires availability of several hardware resources, including one or more of the following:

event monitoring:

counter timers:

performance measurement monitors;

an instruction breakpoint facility;

a data breakpoint facility;

software interrupts; and single step facility (a trace bit).

It will be appreciated by one of ordinary skill in the art that event monitoring is the responsibility of a local hardware block but event management is not. Signals are routed from hardware blocks to a central block for the observer. Communication between the profiled software and the finite state automaton advantageously can be one-way, with no hand shaking. Incorporation of the observer in the profiled software should have no effect on the timing of individual routines. It will also be appreciated that the central hardware block must resolve differences in clock domains and signal propagation.

Moreover, the ideal implementation of the observer being discussed requires hardware support for performance counter timers. According to one preferred embodiment of the present invention, the finite state automaton preferably is responsive to at least 4 counter timer bits generated by the hardware running the profiled software interleaved with finite state automaton. These include:

a current value;

a PROGRAM_RUN bit;

an OBSERVER_RUN bit; and a BUSY bit.

Two RUN bits are provided to permit:

observer overhead to be calculated to thereby provide feedback otherwise overhead to be increased due to the need to start and stop timers The ideal implementation of the preferred embodiment assumes that the hardware includes circuitry for distinguishing between execution of the finite state automaton and the profiled software, for example by employing a bit in a program control and status word (PCSW). Otherwise, instructions must be included to stop and start timers and to discount observer overhead.

It should be mentioned that one timer is reserved for counting processor (CPU) clock cycles; in the exemplary case of a Philips TriMedia processor, this timer is referred to as "Timer 0". The output from other timers is fed from instruction and data breakpoints, in that when such a breakpoint condition is met, the timer associated with the breakpoint setting initiates an event, as described below.

It should be mentioned at this point that a counter timer can be used in two modes of operation in the implementation of the observer.

during a trigger phase, wherein the initial count is negative and is used as a timer to generate an interrupt when the timer counts up to "0"

during a measurement phase, wherein the initial count value begins at zero and is used as counter when a programmable value is reached In an ideal implementation of the preferred embodiment, instruction breakpoints advantageously can be associated with the fetch unit or an instruction cache, which can be implemented using an associative memory. A ideal implementation preferably incorporates at least 4 instruction/data breakpoints.

More specifically, an individual breakpoint can be represented by two registers specifying a range of addresses and a control register. The breakpoint can be specified as follows:

the LOW register indicates the low address of the range; and the HIGH register indicates the high address of the range; while the CONTROL register contains the following:

a bit mask of events;

a timer ID; and a MATCH bit indicating that an event has been generated.

Alternately, an individual breakpoint can be triggered by dynamically swapping a machine code instruction with one that is a breakpoint instruction when the underlying processor has that capability, as is generally the case with the Intel x86 class of processors. Such a machine code instruction is then restored when the breakpoint event has been restored.

For a device like the Philips' TriMedia processor, the following is an indicative list of instruction events:

instruction fetch;

operation fetch;

operation predicate valid;

instruction cache cycle;

instruction cache miss;

branch taken;

branch not taken;

procedure call;

procedure return;

interrupt executed;

exception executed;

indirect jump; and

Table Lookaside Buffer (TLB) miss.

In the range-based hardware instruction breakpoint mechanism, the bit mask is an event filter. Thus, when a hardware event occurs, and when the addresses match, and when the appropriate bit in the event mask is positioned properly for the event type, and when the MATCH bit is set, then an event is generated for the timer specified. The same timer can be multiplexed with multiple breakpoints.

In an ideal implementation of the preferred embodiment, data breakpoints are associated with events from the memory unit or data cache and are represented in the same way as in a range based instruction breakpoint mechanism and there are at least four data breakpoints.

The following is a representative list of data events:
load (can include data size);
store (can include data size);
Bank Conflict;
prefetch;
I/O access;
data cache miss;
data cache miss cycle; and
TLB miss.

In an ideal implementation of the preferred embodiment, single stepping is implemented by generation of an instruction breakpoint. This permits breakpoints on instructions, procedure calls, branches, exceptions and interrupts.

It should be mentioned that if interrupts are imprecise, a single step facility can be implemented by the finite state automaton using a trace bit in the program status word and an exception. Alternately, if available in the processor, the finite state automaton can make use of innate single step execution interrupt functionality.

A block diagram of the observer, i.e., the finite state automaton in operation, in an ideal implementation of the preferred embodiment is shown in the far right side of FIG. 1A, with more detail provided in box 310 of FIG. 1B.

It can be seen that the observer according to one preferred embodiment of the present invention has access to the program memory (instructions and data) as depicted in the right side of FIG. 1A. Thus, with reference to FIGS. 1A and FIG. 1B., it will be observed that:

The observer executes concurrently and is interleaved with the profiled program;
Execution of the program is sequential;
Execution of the observer is by non-blocking code segments;.
Sequencing between these segments is interrupt driven;
Activation of the observer is from initialization;
Return to the program is by a return from interrupt;
Subsequent activations are by timer interrupts and trace exceptions;
Data memory and counter timers are shared between the program and the observer;
Results are written to an output log; and
Scratch pad storage is used for state information.

Execution of the observer can be subdivided into several phases, each of which will be described in greater detail below. These phases of observer or state machine operation are as follows:
Startup phase;
Trigger phases;
Measurement startup phases;
Measurement phases;
Output flush phases;

In an ideal implementation of a preferred embodiment of the present invention, to is assumed that there is no practical limitation on hardware resources (e.g. timers).

It will be noted that the startup phase sets up the observer. Pseudo code for an example startup phase is shown in FIG. 2.

Figure 2:
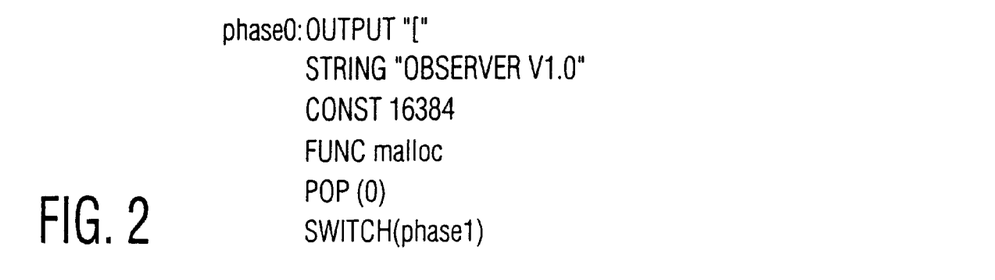
FIG. 2 illustrates exemplary pseudo code for the start-up phase of the finite state automaton.

It will be appreciated that the code routine illustrated in FIG. 2 outputs a control code to the output log followed by the output of a software version identifier. Still referring to FIG. 2, the CONST opcode pushes its parameter onto the stack. 16384 bytes of the memory, which is then allocated by a callback to the function 'malloc'.

Subsequently, the top of the stack is popped off, and stored in scratch pad location zero, as an address for observer tables.

It should be mentioned that the SWITCH code line signifies that the finite state machine then goes to phase1, a trigger phase. The corresponding pseudo code for a trigger phase is shown in FIG. 3, which will be discussed in greater detail immediately below.

Figure 3:
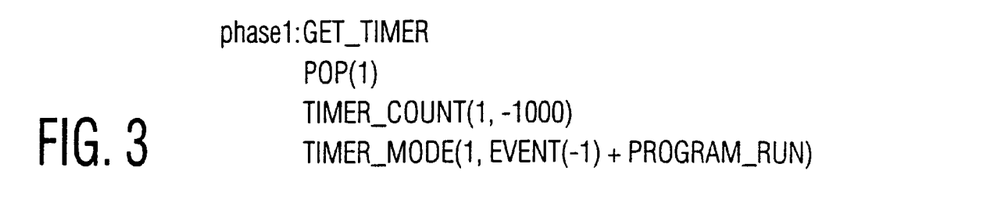
FIG. 3 illustrates exemplary pseudo code for a trigger phase of the finite state automaton.

In FIG. 3, a counter timer is reserved using GET_TIMER. The address of the timer is stored in scratch pad memory at location 1. The COUNT register is set to generate an interrupt after 1000 clock cycles ("EVENT(-1)"). In an ideal implementation of a preferred embodiment of the present invention, clock cycles do not include observer overhead.

Figure 4:
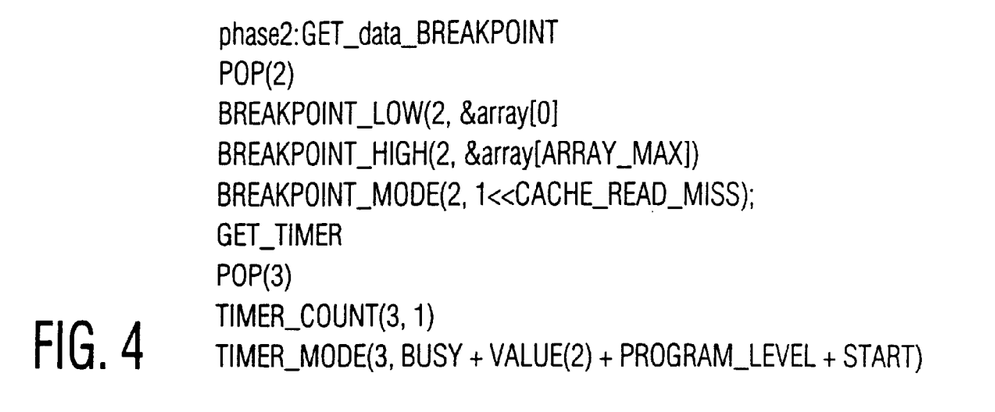
FIG. 4 illustrates exemplary pseudo code for another trigger phase of the finite state automaton.

Pseudo code for a second trigger is given in FIG. 4. It will be appreciated that this trigger allocates a data breakpoint (stored in scratch pad memory at location 2) and an associated timer (stored in scratch pad memory at location 3) to trigger the interrupt when the desired event, i.e., a cache read miss, occurs. It should be mentioned that triggers can be applied sequentially or in parallel.

Figure 5:
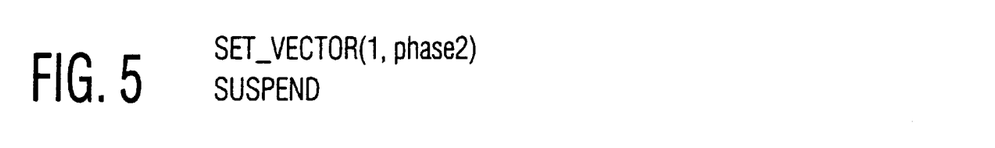
FIG. 5 illustrates exemplary pseudo code for sequential triggering for FIG. 4. from FIG. 3. in the finite state automaton.
Figure 6:
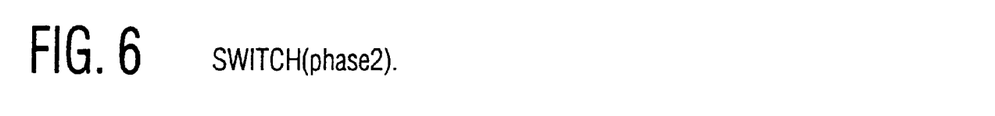
FIG. 6 illustrates exemplary pseudo code for paralle triggering for FIG. 4. from FIG. 3. in the finite state automaton.

Ending phase1 (FIG. 3) with the pseudo code shown in FIG. 5, sets up sequential triggering for phase2, as the SUSPEND opcode is a return from interrupt and control is passed to the profiled software. In contrast, Ending phase1 (FIG. 3) with the pseudo code shown in FIG. 6 sets up parallel triggering for phase2.

Figure 7:
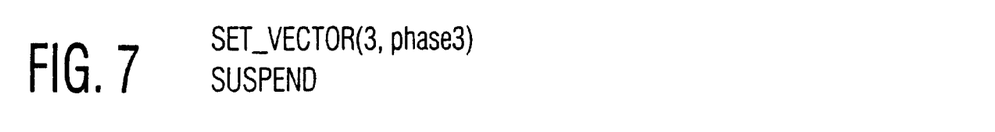
FIG. 7 illustrates exemplary pseudo code for the terminate trigger phase in FIG. 3. in the finite state automaton.

The sequence of trigger phases normally terminates with a measurement phase. In the exemplary preferred embodiment under discussion, this corresponds to ending phase2 with the pseudo code illustrated in FIG. 7, where "phase3" is the measurement phase.

It will be noted that the measurement startup phase sets up all necessary variables for measuring a particular activity or set of activities. The example in FIG. 8 illustrates the pseudo code which can be used in an exemplary embodiment to set up measurement for basic routine executions, instruction cycles and data cache cycles.

Figure 8:
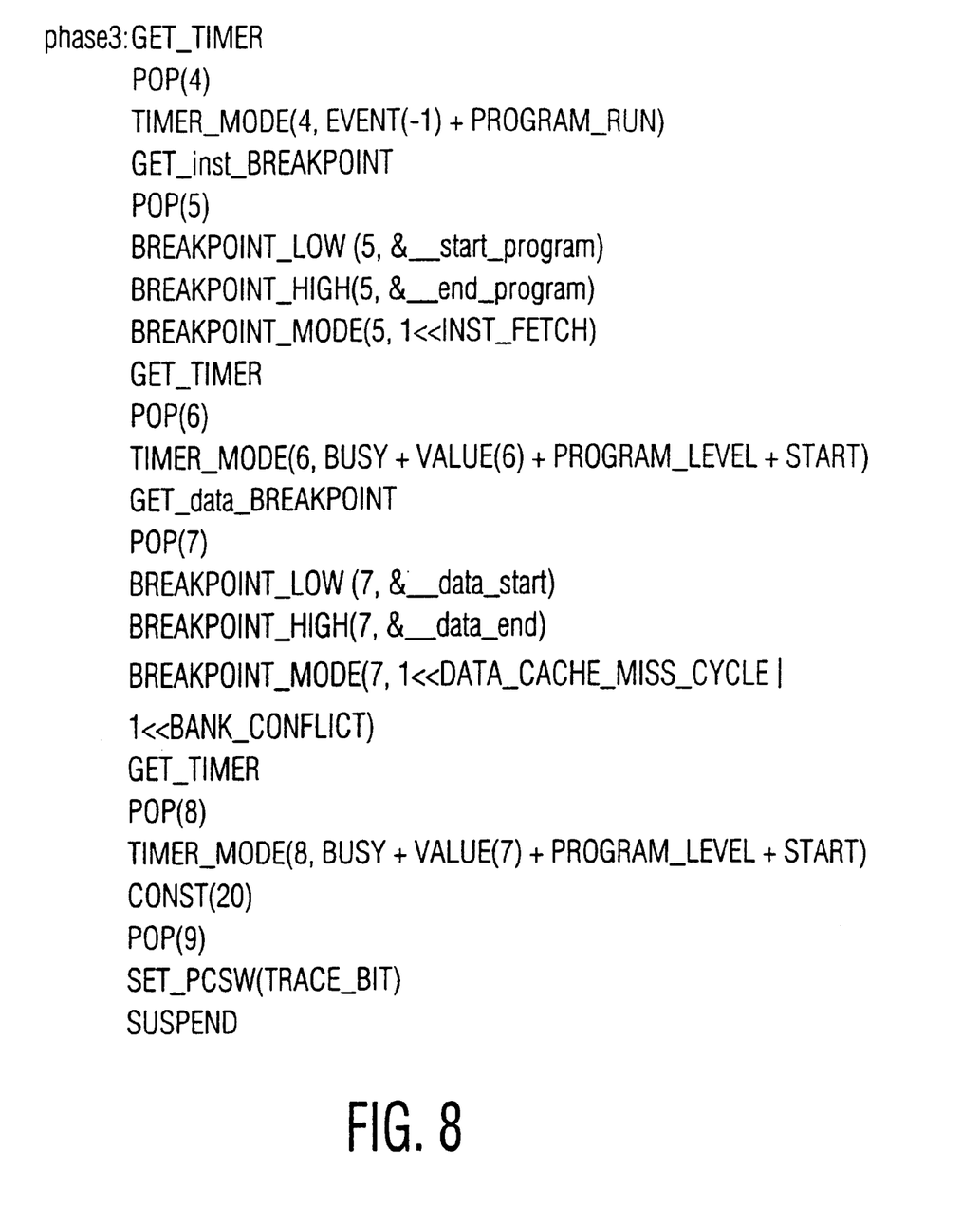
FIG. 8 illustrates exemplary pseudo code for the set-up of the measurement phase of the finite state automaton.

Referring specifically to FIG. 8, in the first three lines, a timer is allocated and set to count CPU clock cycles ("EVENT(-1)") in the main program, i.e., the profiled software.

The next eight instructions illustrated in FIG. 8, starting with "GET_inst_BREAKPOINT" and ending with "TIMER_MODE(6 . . . ")", allocate an instruction breakpoint to count fetches inside the range of addresses in the program (scratch pad memory location 5).

The next eight instructions, the code starting with "GET_data_BREAKPOINT" and ending with "TIMER_MODE(7 . . . ")", allocate a data breakpoint to measure cache cycles.

The next two lines ("CONST(20)", "POP(9)") set up scratch pad location 9 to be used as a temporary location to measure execution of twenty code blocks, i.e., routines.

The final two instructions in FIG. 8 set the trace bit in the Program Control and Status Word (PCSW), which causes a trace exception to be taken after each execution of a block of code in the user software.

Figure 9:
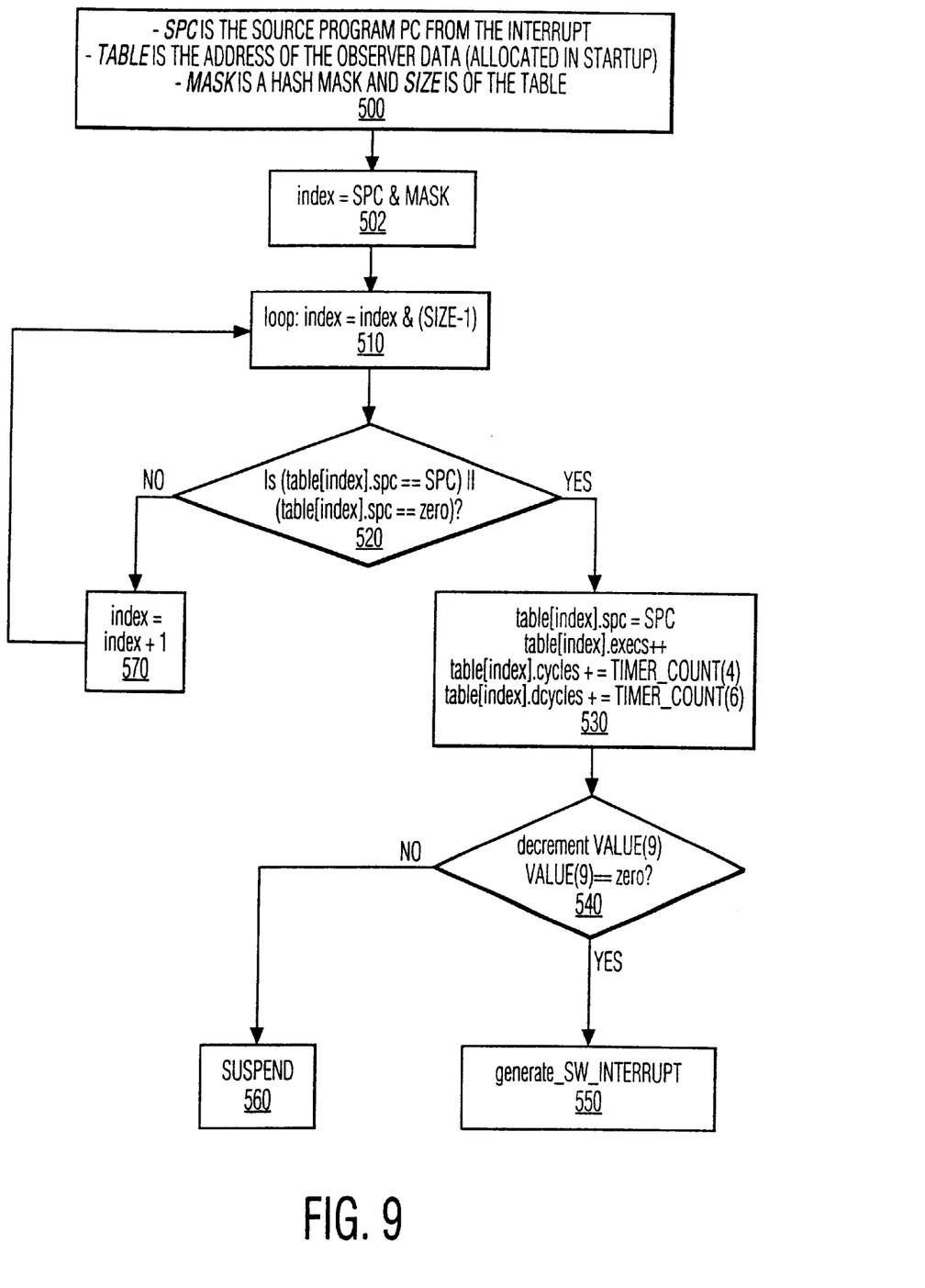
FIG. 9 illustrates a high level flowchart example of how to accumulate basic block execution statistics in a hash table in the finite state automaton.

It should be mentioned here that the measurement phases, like the trigger phases, are programmable. The flow chart illustrated in FIG. 9 is provided as an example of how to accumulate basic block execution statistics in a hash table. Definition 500 describes the variables used in the flow chart of FIG. 9. In step 502, an index value is generated based on the source program address or program counter (PC) in the profiled software (the value provided to the finite state automaton during an interrupt) and a hash mask. Step 510 depicts a loop operation which continues only so long as the index value is within the proper range. In step 510 the hash table source program counter (SPC) value is used to determine if there is already an existing entry in the hash table for the current SPC or if an empty entry exists (hash table SPC value of zero). If either of those cases exist, step 530 is taken. Step 530 updates the counter entries for the current SPC entry. In step 540, the counter indicating the number of remaining measurements ("VALUE(9)") is decremented, and if zero, the current measurement phase to collect basic block execution statistics is terminated in step 550 via a software interrupt to another section of the finite state automaton. In the event that there are still measurements to be taken, the function to accumulate block execution statistics is suspended in step 560, and waits to be called again with measurement information. If there isn't a match for the SPC in the hash table in step 520, or if the current entry is not available in step 520, the hash index is incremented in step 570 to point to the next hash table entry and returns to the loop operation in step 510.

It should also be mentioned that in a typical use of the observer, a measurement phase is followed by a trigger phase in an infinite loop. This permits the finite state machine to run continuously; the observer is stopped on program termination.

It should be noted that in an ideal implementation of a preferred embodiment of the present invention, allocated timers and scratchpad locations would also be reused as appropriate. For such functionality, live range analysis advantageously can be applied to timer values. It will be noted that this technique is often used in optimizing compilers to determine when the value of a variable is no longer referenced. In an alternate implementation, such as that for the Philips TriMedia TM-1000 processor, the software Application Programming Interface (API) can provide for resource conflict resolution, for example by a callback function to release a timer.

A data flush phase formats and copies entries from memory into the output log. For instance, for a hash table implementation, this corresponds to outputting non-empty entries. In an ideal preferred mode of implementation, the data flush phase is entered by a low priority software interrupt when the measurement phase detects occupancy reaching a high water mark. Limiting occupancy ensures hash efficiency. In an ideal implementation of a preferred embodiment, the data flush phase reduces table occupancy to a low water mark. Use of a low water mark avoids thashing.

Control of overhead and accuracy is an important feature of the present invention. A key aspect of the observer is control by the user to adjust measurement overhead. An estimate of the total overhead as feedback is very useful. Overhead can be defined as the ratio of execution time in the observer divided by the total execution time. A straightforward way of getting an overhead estimate involves adding code in each phase to account for its overhead. Alternatively, a counter timer can be reserved with the OBSERVER_RUN bit set. Note that in either case, a counter must be implemented if it is necessary to keep track of the total execution time. This is available in many implementations as a dedicated counter. It should be noted that the former method increases software overhead while the latter method increases hardware overhead.

It should be mentioned that the log analyzer should compute the sampling ratio. This can be defined as the total measured cycles in the program divided by the total cycles. It is preferable to scale up reported cycle times by this ratio when reporting statistics. If subsampling is being used individual ratios are necessary.

In an alternate preferred implementation, timer subsampling is used to minimize resource requirements. Subsampling is based on the fact that the importance of all program variables is not identical. On a device like the Philips TriMedia processor, the following hierarchy can be established:

| Event | Code | Sampling Frequency (percent) |
|---|---|---|
| dtree executions | D | 100 |
| total cycles | T | 100 |
| instruction cycles | I | 50 |
| data cache cycles | D | 25 |
| memory accesses | M | 15 |
| I cache cycles | i | 5 |
| copy backs | d | 5 |

The first two entries have a 100 percent sampling ratio because:

the PC is available on each trace interrupt; and there is a dedicated counter on the TriMedia processor for total cycles.

The remaining five entries can be subsampled using a single timer. This corresponds to switching the timers using a scheduling algorithm. For example, the following schedule describes the sampling frequency (using the code-event correspondence from the table above).

IIIIDDDDDDMMMidIIIII

In terms of resource sharing, a mechanism is necessary to prevent conflict in resource usage between the observer and the program. In the TriMedia prototype, a common API was used. The BUSY bit described in the ideal implementation of a preferred embodiment of the present invention reference model can also be used. If neither of these is possible, a dedicated timer for the observer is necessary. The same hardware mechanisms are useful for the observer and a debugger. With resource sharing, the two can be executed concurrently.

The observer or finite state automaton coexists with the profiled software during execution and, in an exemplary case, is linked to the profiled software. The following mechanisms, corresponding to the state of the art, are useful to communicate between the observer and the profiled software:

an API can be used to invoke the observer;

a software interrupt can be used to invoke the interrupt level;

a callback function can be used to invoke the user program from the observer or for functionality;

an interrupt can be generated instead of a callback function for a hardware implementation; and a fixed communication address (mailbox) can be used for communication.

Figure 10A:
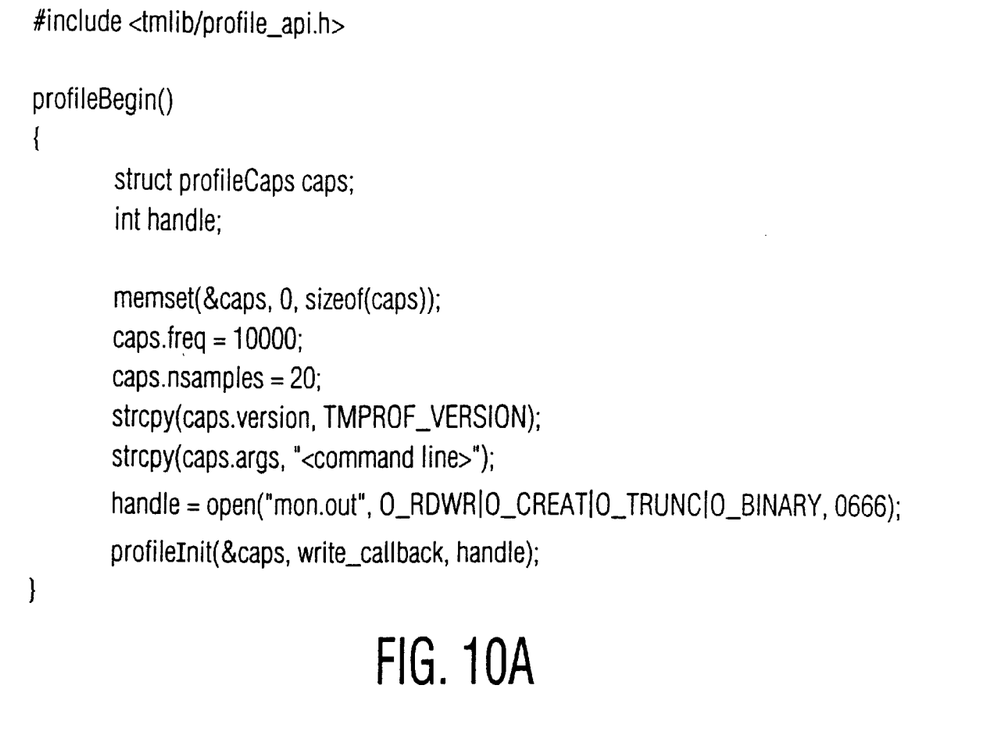
FIG. 10A illustrates source code to initialize the profiling API used by the TMPROF program on the Philips TriMedia TM-1000.

The alternate preferred embodiment, as implemented on the TriMedia TM-1000 device, uses a profiling API (application programming interface), software interrupts, and callback functions. The profiling API functions for this implementation is shown in FIG. 10A, $$$. When using the profiling API in the software being profiled, a few additions need to be made to the source code. In particular, code needs to be added to initialize profiling on startup, a callback function should be written to output data, and code can be optionally added to turn profiling on and off during execution of the profiled software.

Figure 10B:
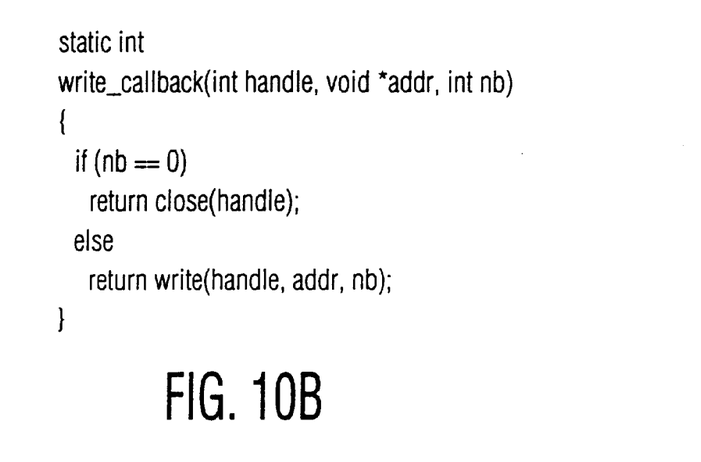
FIG. 10B illustrates source code to output the profiling buffer using the profiling API used by the TMPROF program on the Philips TriMedia TM-1000.

FIG. 10A shows sample source code as might be used to initialize the profiling API. After initializing variables, a small block of memory is allocated for a structure "caps" defining the profiling parameters. The "freq" parameter in the sample source code in FIG. 10A is set to generate a timer every 10,000 clock cycles, while the "nsamples" parameter is set to measure the behavior of decision trees every sample. Removing these two assignments means profiling the whole program. The version string is then inserted into the parameter structure, as are any command line directives. The log file is opened, and a call is made to the API function "profileInit( )" to initialize the profiling API. The arguments to the API function "profileInit" are the parameters, a pointer to the call back function, and an open file descriptor One way to output data is via a callback function which performs the actual output. FIG. 10B shows sample source code for this method of writing profiling output data. For this sample write callback function, the input parameters—a file handle, data buffer source address, and number of bytes— are the same as the POSIX write system call. The first parameter identifies the file. It is a file descriptor from the example in FIG. 10A. The second and third arguments correspond to an array of characters. All the data needs to be written, in the order specified, to a file on the host system, in binary format, without conversion or insertion. In the case of the profiling library, a 1K byte (1024 bytes) buffer is used. A byte count parameter of zero means the profiled output is flushed to the host system. The function shown in FIG. 10B can be used while the program is running. It should also be noted that the profiling API function "profileFlush( )", detailed further below, needs to be called when output is needed or at the end of the profiled software.

Figure 10C:
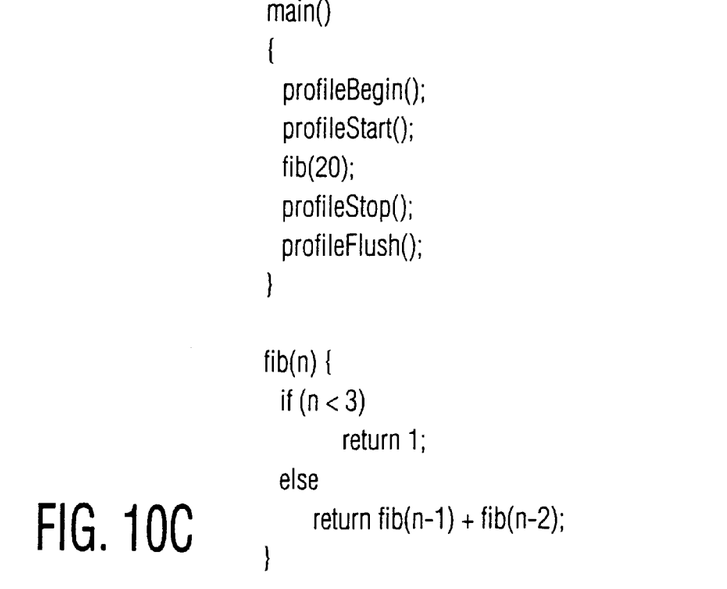
FIG. 10C illustrates source code to start and stop profiling selectively via the profiling API used by the TMPROF program on the Philips TriMedia TM-1000.

FIG. 10C provides an example of how the profiled software would use the profiling API to start and stop the profiling process. The example uses a simple program which generates a series of numbers—a Fibonacci series with 20 generated numbers to be exact. Upon execution of the program, a call is made to a "profileBegin( )" function such as that shown in FIG. 10A. Next, the profiling API function "profileStart( )" function is called to enable profiling. This function performs its task in this example by generating a debugger interrupt. The debugger interrupt activates the profiling mechanism. To deal with the case where profiling is running already, the TFE (trace) bit in the TriMedia processor is cleared and the timer is stopped. Next, the function being profiled, namely the Fibonacci number generator, is executed. Upon return from that function, a call to the "profileStop( )" function is made to disable profiling. In this example, this function accomplishes this by stopping the timer and by clearing the TFE (trace) bit. Finally, the profileFlush function flushes the profiled output to the host system.

Figure 10D:
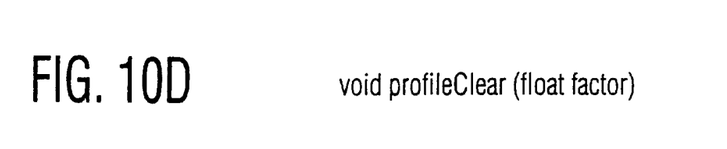
FIG. 10D illustrates source code to clear the profiling buffer of the profiling API used by the TMPROF program on the Philips TriMedia TM-1000.

FIG. 10D shows an example of how to clear the profiling buffer, which should be done so as to take several samples during an execution of a program. The single argument corresponds to the maximum occupancy of the profiling table. The table is implemented as a hash buffer and occupancies >50 percent result in increased overhead. If the table overflows, only samples corresponding to decision trees in the table are recorded.

Figure 10E:
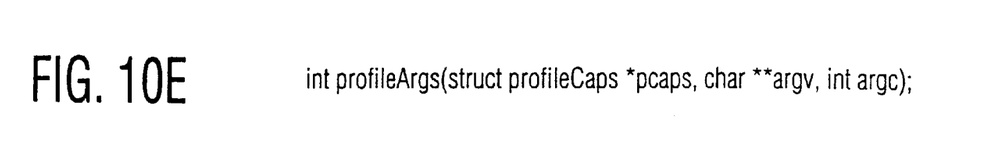
FIG. 10E illustrates source code to process the command line parameters specified at profiled software runtime via the profiling API used by the TMPROF program on the Philips TriMedia TM-1000.

FIG. 10E demonstrates command line processing, which is optionally performed to initialize the profiling parameters, via a call to the profiling API function "profileArgs( )". The first argument to this function points to the profiling parameters. These are pre-initialized to default values at runtime. The second and third arguments correspond to the vector of command line arguments, as incorporated in C. The return value from this function is the argument count The preferred embodiment for the TM-1000 processor also offers three user programmable parameters:
the number of clock cycles between timer interrupt samples
the number of program counter entries sample per interrupt
the size of the profiling buffer The preferred embodiment for the TM-1000 processor assumes that the hardware includes circuitry for distinguishing between execution of the observer and the profiled software, for example by a bit in the PCSW. Otherwise, instructions must be included to stop and start timers and to discount observer overhead.

In another alternate preferred embodiment, the profiling process is implemented as hardware in the form of a separate debugging processor at the cost of a few tens of thousands of gates. Such a hardware implementation of the preferred embodiment is useful in hardware debugging, such as during the difficult processor bring-up phase.

It should also be mentioned that the present invention can operate as well in a multi-tasking environment as it does in a single tasking environment. In a multi-tasking environment, where profiling of a particular task is desired, is achieved via mechanism such as that presented in source code form in FIG. 11, which shows how profiling information can be captured on a task or a component level. In this examlpe, "root(void)" is the pSOS (a sample operating system used in real-time controllers) main function, which creates two tasks, "task1" and "task2", then initializes the profiling API and continues its operation.

Figure 11:
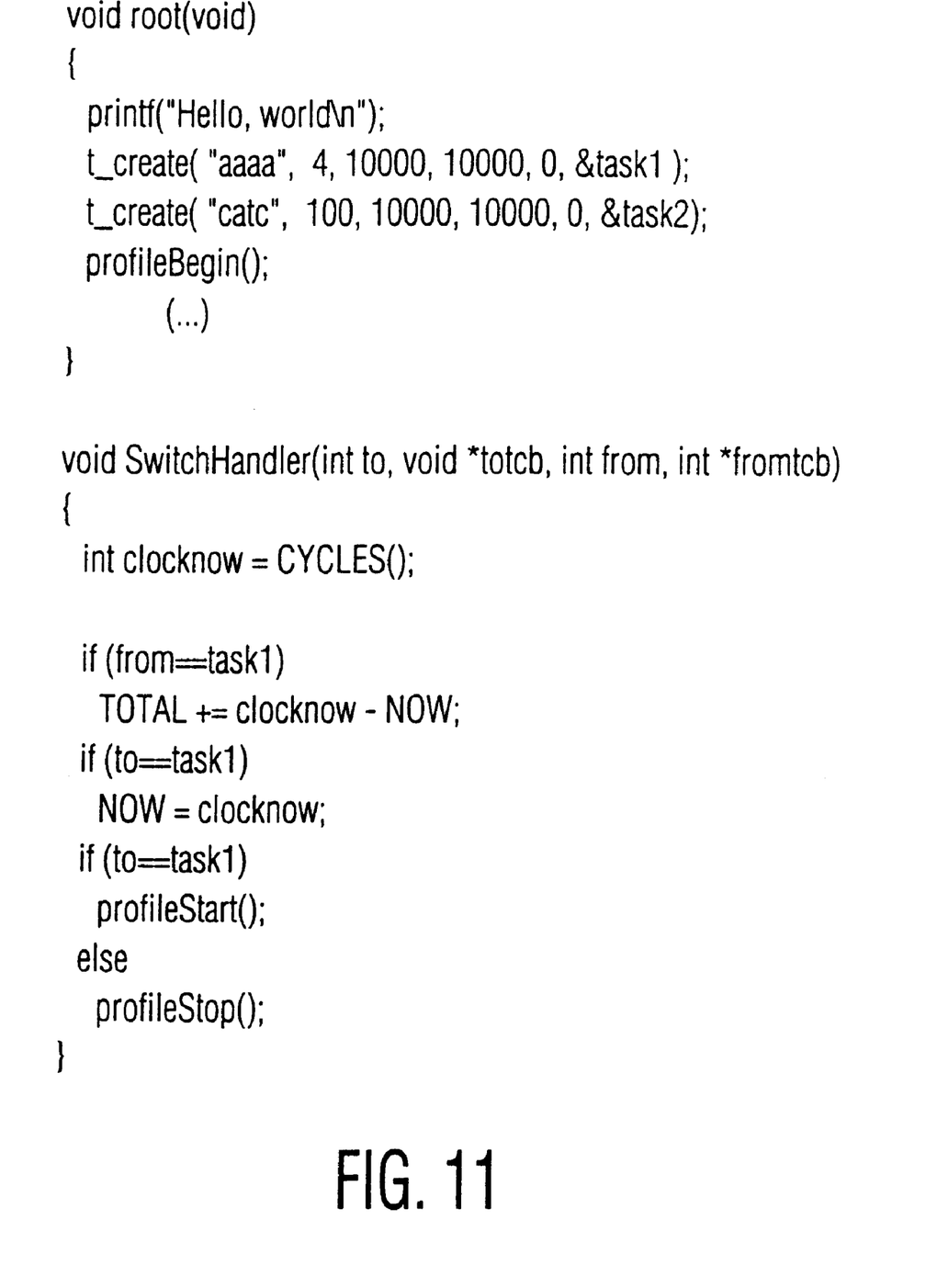
FIG. 11 illustrates a source code example of how the invention can be used for task based profiling.

The other function in FIG. 11, "SwitchHandler( )", is a the name of a pSOS call back function, which is called every time a task switch occurs. "Switchfandler( )" tallies only the time spent in the task being profiled, excluding time spent during the execution of non-profiled tasks. It should also be noted that in this function, the API profiling function "profileStart( )" is called when switching context to "task1". The API profiling function "profilestop" is called when switching contextftom "task1".

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for analyzing the performance of application software during execution thereof by a computer system implementing profiling software generating a finite state automaton, including the steps of:

(a) executing the profiling software to thereby generate the finite state automaton incorporating at least one user-selected performance parameter;

(b) executing the application software and the finite state automaton in an interleaved fashion;

(c) observing the execution of at least one selected routine of the application software using the finite state automaton; and (d) generating performance data indicative of performance of the selected routine of the application software.

2. The method as set forth in claim 1, wherein the finite state automaton is executed in said step (b) in response to at least one programmable hardware interrupt controlled by the finite state automaton.

3. The method as set forth in claim 1, wherein a user specifies the selected routines of the application software to be observed.

4. The method as set forth in claim 2, wherein step (a) further comprises generating the finite state automaton facilitating stochastic sampling of at least one selected performance parameter of the at least selected routines of the application software; and wherein said step (b) further comprises initializing the application software and the finite state automaton to establish hardware conditions under which the at least one hardware interrupt will be generated.

5. The method as set forth in claim 4, further including the step of (e) linking the finite state automaton to the application software to resolve references in object code of the finite state automaton with references in object code of the application software to thereby create a linked executable program that integrates the application software with the finite state automaton.

6. The method as set forth in claim 5, wherein step (e) is performed following performance of step (a).

7. The method as set forth in claim 4, wherein the finite state automaton selects breakpoints on a real-time basis as the application software and the finite state automaton are being executed in an interleaved fashion.

8. The method as set forth in claim 4, wherein a user specifies the selected routines of the application software to be observed, whereby the user has the facility to control overhead associated with the execution of the profiling software.

9. The method as set forth in claim 1, further including the step of adjusting the performance data associated with the profiling software to thereby take into account overhead associated with the execution of the finite state automaton.

10. The method as set forth in claim 9, wherein said at least one selected routine comprises a plurality of routines and wherein a user specifies a weighting factor for each of the routines that controls a sampling frequency of a corresponding selected performance parameter.

11. The method as set forth in claim 1, further including the step of (f) post processing the performance data to provide a human readable indication of the observed performance of the at least one selected routine of the application software.

12. The method as set forth in claim 1, wherein the finite state automaton is executed in said step (b) in response to at least one programmable hardware interrupt controlled by the finite state automaton, and wherein said programmable hardware interrupt includes at least one timer interrupt.

13. The method as set forth in claim 1, wherein the finite state automaton is executed in said step (b) in response to at least one programmable hardware interrupt controlled by the finite state automaton, and wherein said programmable hardware interrupt includes at least one breakpoint interrupt.

14. The method as set forth in claim 1, wherein the finite state automaton is executed in said step (b) in response to at least one programmable hardware interrupt controlled by the finite state automaton, and wherein said programmable hardware interrupt includes at least one timer interrupt and at least one breakpoint interrupt.

15. The method as set forth in claim 1, wherein the method is performed without requiring any modification of source code of the application software.

16. The method as set forth in claim 1, wherein the method is performed without requiring any modification of object code of the application software.

17. A method for analyzing the performance of application software during execution thereof by a computer system implementing profiling software generating a finite state automaton, including the steps of:

(a) selecting at least one user-selected performance parameter for application to the profiling software;

(b) executing the profiling software to thereby generate the finite state automaton facilitating stochastic sampling of at least one selected performance parameter of an at least one selected routine of the application software;

(c) linking the finite state automaton to the application software to resolve references in object code of the finite state automaton with references in object code of the application software to thereby create a linked executable program that integrates the application software with the finite state automaton;

(d) executing application software routines and finite state automaton functions of the linked executable program in an interleaved fashion to thereby establish hardware conditions under which at least one hardware interrupt will be generated;

(e) observing the execution of at least one selected routine of the application software routines of the linked executable program using the finite state automaton functions; and (f) generating performance data indicative of the performance of the selected routine of the application software routines.

18. The method as set forth in claim 17, wherein the finite state automaton function is executed in said step (c) in response to at least one programmable hardware interrupt established by the finite state automaton.

19. The method as set forth in claim 17, wherein a user specifies the selected routines of the application software to be observed.

20. The method as set forth in claim 17, wherein the finite state automaton selects breakpoints on a real-time basis as the application software routines and the finite state automaton of the linked executable program are being executed in an interleaved fashion.

21. The method as set forth in claim 17, wherein a user specifies the selected routines of the application software to be observed, whereby the user has the facility to control overhead associated with the execution of the profiling software.

22. The method as set forth in claim 17, wherein said at least one selected routine comprises a plurality of routines and wherein a user specifies a weighting factor for each of the routines that controls a sampling frequency of a corresponding selected performance parameter.

23. The method as set forth in claim 17, wherein the finite state automaton functions are executed in response to at least one programmable hardware interrupt established by the finite state automaton, and wherein said programmable hardware interrupt includes at least one timer interrupt.

24. The method as set forth in claim 17, wherein the finite state automaton functions are executed in response to at least one programmable hardware interrupt established by the finite state automaton, and wherein said programmable hardware interrupt includes at least one breakpoint interrupt.

25. The method as set forth in claim 17, wherein the finite state automaton fimctions are executed in response to at least one programmable hardware interrupt established by the finite state automaton, and wherein said programmable hardware interrupt includes at least one timer interrupt and at least one breakpoint interrupt.

26. The method as set forth in claim 17, wherein the method is performed without requiring any modification of source code of the application software.

27. The method as set forth in claim 17, wherein the method is performed without requiring any modification of object code of the application software.

28. A computer system for analyzing the performance of application software during execution thereof by employing profiling software generating a finite state automaton, comprising:

first means for executing the profiling software to thereby generate the finite state automaton incorporating at least one user-selected performance parameter;

second means for executing the application software and the finite state automaton in an interleaved fashion;

third means for observing the execution of at least one selected routine of the application software using the finite state automaton; and fourth means for generating performance data indicative of performance of the selected routine of the application software.

29. The computer system as set forth in claim 28, wherein the finite state automaton is executed in response to at least one programmable hardware interrupt controlled by the finite state automaton.

30. The computer system as set forth in claim 28, further comprising fifth means for linking the finite state automaton to the application software to resolve references in object code of the finite state automaton with references in object code of the application software to thereby create a linked executable program that integrates the application software with the finite state automaton.

31. The computer system as set forth in claim 28, wherein the finite state automaton selects breakpoints on a real-time basis as the application software and the finite state automaton are being executed in an interleaved fashion.

32. The computer system as set forth in claim 28, further comprising sixth means for adjusting the performance data associated with the profiling software to thereby take into account overhead associated with the execution of the finite state automaton.

33. The computer system as set forth in claim 28, wherein said at least one selected routine comprises a plurality of routines and wherein a user specifies a weighting factor for each of the routines that controls a sampling frequency of a corresponding selected performance parameter.

34. The computer system as set forth in claim 28, further comprising seventh means for processing the performance data to provide a human readable indication of the observed performance of the at least one selected routine of the application software.

35. The computer system as set forth in claim 28, wherein the finite state automaton is executed in response to at least one programmable hardware interrupt controlled by the finite state automaton, and wherein said programmable hardware interrupt includes at least one timer interrupt.

36. The computer system as set forth in claim 28, wherein the finite state automaton is executed in response to at least one programmable hardware interrupt controlled by the finite state automaton, and wherein said programmable hardware interrupt includes at least one breakpoint interrupt.

37. The computer system as set forth in claim 28, wherein the finite state automaton is executed in response to at least one programmable hardware interrupt controlled by the finite state automaton, and wherein said programmable hardware interrupt includes at least one timer interrupt and at least one breakpoint interrupt.

38. The computer system as set forth in claim 28, wherein said first through said fourth means operate without corresponding modification of source code of the application software.

39. The computer system as set forth in claim 28, wherein said first through said fourth means operate without corresponding modification of object code of the application software.

40. Machine readable code stored in a memory for converting a general purpose computer system into a dedicated computer system for analyzing the performance of application software during execution of a plurality of software devices, comprising:

a first software device which adjusts performance data associated with profiling software to thereby take into account overhead associated with the execution of a finite state automaton;

a second software device which generates the finite state automaton incorporating at least user-selected performance parameter;

a third software device which links the finite state automaton to the application software to thereby resolve references in object code of the finite state automaton with references in object code of the application software to thereby create a linked executable program that integrates the application software with the finite state automaton;

a fourth software device which exeutes the application software routines and finite state automaton functions of the linked executable program in an interleaved fashion to thereby observe the execution of at least one selected routine of the application software routines using a corresponding finite state automaton function and to thereby generate performance data indicative of performance of the selected routine of the application software routines; and a fifth software device which processes the performance data to thereby provide a human readable indication of the observed performance of the at least one selected routine of the application software.

41. The machine readable code as set forth in claim 40, wherein the finite state automaton functions are executed in response to at least one programmable hardware interrupt controlled by the finite state automaton.

42. The automaton readable code as set forth in claim 40, wherein the finite state machine selects breakpoints on a real-time basis as the application software and the finite state automaton are being executed in an interleaved fashion.

43. The machine readable code as set forth in claim 40, wherein said at least one selected routine comprises a plurality of routines and wherein a user specifies a weighting factor for each of the routines to said first software device to thereby control sampling frequency of a corresponding selected performance parameter.

44. The machine readable code as set forth in claim 40, wherein the finite state automaton function is executed in response to at least one programmable hardware interrupt controlled by the finite state automaton, and wherein said programmable hardware interrupt includes at least one timer interrupt.

45. The machine readable code as set forth in claim 40, wherein the finite state automaton function is executed in response to at least one programmable hardware interrupt controlled by the finite state automaton, and wherein said programmable hardware interrupt includes at least one breakpoint interrupt.

46. The machine readable code as set forth in claim 40, wherein the finite state automaton function is executed in response to at least one programmable hardware interrupt controlled by the finite state automaton, and wherein said programmable hardware interrupt includes at least one timer interrupt and at least one breakpoint interrupt.

* * * * *